(12) United States Patent
Min et al.

(10) Patent No.: US 10,625,705 B2
(45) Date of Patent: Apr. 21, 2020

(54) ROOF AIRBAG APPARATUS

(71) Applicant: HYUNDAI MOBIS CO., LTD., Seoul (KR)

(72) Inventors: Byung Ho Min, Seoul (KR); Hae Kwon Park, Yongin-si (KR); Seok Min Lee, Yongin-si (KR); Kyu Sang Lee, Yongin-si (KR); Jong Seob Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 82 days.

(21) Appl. No.: 15/899,839

(22) Filed: Feb. 20, 2018

(65) Prior Publication Data

US 2018/0265029 A1 Sep. 20, 2018

(30) Foreign Application Priority Data

Mar. 16, 2017 (KR) .................. 10-2017-0033410

(51) Int. Cl.

| B60R 21/233 | (2006.01) |
| B60R 21/214 | (2011.01) |
| B60R 21/23 | (2006.01) |
| B60R 21/231 | (2011.01) |
| B60R 21/2338 | (2011.01) |
| B60R 21/16 | (2006.01) |

(52) U.S. Cl.
CPC .......... *B60R 21/233* (2013.01); *B60R 21/214* (2013.01); *B60R 21/23* (2013.01); *B60R 2021/161* (2013.01); *B60R 2021/23107* (2013.01); *B60R 2021/23192* (2013.01); *B60R 2021/23316* (2013.01); *B60R 2021/23324* (2013.01); *B60R 2021/23382* (2013.01); *B60R 2021/23386* (2013.01)

(58) Field of Classification Search
CPC ... B60R 21/213; B60R 21/214; B60R 21/215; B60R 21/233; B60R 21/2338; B60R 2021/23192; B60R 2021/23386; B60R 2021/23388
See application file for complete search history.

(56) References Cited

U.S. PATENT DOCUMENTS

| 6,070,902 | A | * | 6/2000 | Kowalski | ............ B60R 13/0225 |
| | | | | | 280/730.2 |
| 6,189,960 | B1 | * | 2/2001 | Mumura | ................ B60J 7/0015 |
| | | | | | 160/7 |
| 6,783,174 | B2 | * | 8/2004 | Bohm | .................... B60J 7/0573 |
| | | | | | 296/223 |
| 6,817,626 | B2 | * | 11/2004 | Boll | ...................... B60R 21/213 |
| | | | | | 280/730.1 |

(Continued)

*Primary Examiner* — Barry Gooden, Jr.
(74) *Attorney, Agent, or Firm* — Knobbe Martens Olson & Bear LLP (57) ABSTRACT

A roof airbag apparatus may include: a gas injection unit configured to discharge gas; a tether guide extending in a longitudinal direction of a roof; and an airbag configured to be deployed by gas transferred from the gas injection unit. The airbag may include: a first chamber part coupled to the tether guide and configured to be deployed in a longitudinal direction of the tether guide by gas transferred from the gas injection unit; and a second chamber part coupled to the first chamber part, and configured to be deployed by gas transferred from the first chamber part and cover the first chamber part.

12 Claims, 7 Drawing Sheets

(56) References Cited

U.S. PATENT DOCUMENTS

| | | | |
|---|---|---|---|
| 8,459,696 B2* | 6/2013 | Browne | B60R 21/08 180/282 |
| 9,771,048 B2* | 9/2017 | Min | B60R 21/214 |
| 2001/0017459 A1* | 8/2001 | Fischer | B60R 21/232 280/730.2 |
| 2002/0074778 A1* | 6/2002 | Melia | B60R 21/201 280/730.2 |
| 2003/0168835 A1* | 9/2003 | Thomas | B60R 21/232 280/730.2 |
| 2004/0066022 A1* | 4/2004 | Mori | B60N 2/42745 280/730.1 |
| 2005/0046159 A1* | 3/2005 | Noguchi | B60R 21/232 280/730.2 |
| 2005/0116450 A1* | 6/2005 | Noguchi | B60R 21/232 280/730.2 |
| 2008/0012275 A1* | 1/2008 | Pinsenschaum | B60R 21/232 280/730.2 |
| 2011/0079990 A1* | 4/2011 | Cheal | B60R 21/213 280/730.2 |
| 2017/0015269 A1* | 1/2017 | Min | B60R 21/214 |
| 2018/0162313 A1* | 6/2018 | Lee | B60R 21/213 |
| 2018/0162314 A1* | 6/2018 | Lee | B60R 21/2338 |
| 2018/0162315 A1* | 6/2018 | Lee | B60R 21/2346 |
| 2019/0016292 A1* | 1/2019 | Son | B60R 21/233 |
| 2019/0111885 A1* | 4/2019 | Hwangbo | B60R 21/2338 |
| 2019/0143928 A1* | 5/2019 | Raikar | B60R 21/0132 280/730.1 |

* cited by examiner

ROOF AIRBAG APPARATUS

CROSS-REFERENCES TO RELATED APPLICATIONS

The present application claims priority to Korean application number 10-2017-0033410, filed on Mar. 16, 2017, which is incorporated by reference in its entirety.

BACKGROUND OF THE INVENTION

The present invention relates to a roof airbag apparatus, and more particularly, a roof airbag apparatus capable of preventing an occupant from being injured or thrown out of a vehicle when a vehicle accident occurs.

In general, an airbag apparatus is installed in a vehicle to ensure safety of a vehicle occupant. A typical airbag apparatus includes a gas injection unit and an airbag. When an external impact of a predetermined magnitude or more is applied to the vehicle, the gas injection unit supplies gas into the airbag and deploys the airbag to protect the occupant.

Such airbag apparatuses may be mounted at various predetermined positions in vehicles, e.g., in a steering wheel installed on an instrument panel, an upper end of a glove box, and side surfaces of a passenger compartment, taking specifications of the vehicles, a target to be protected, etc., into account.

Particularly, a roof airbag apparatus is a kind of airbag apparatus that is mounted in a roof or the like of a vehicle and is to be deployed over an occupant so as to protect the occupant. In such a roof airbag apparatus, an air bag deployed in case of emergency may block an opening of a sunroof installed in the vehicle to prevent the occupant from being thrown out of the vehicle through the opening of the sunroof, and absorb an impact to be applied to the occupant so as to reduce injury of the occupant.

However, in the case of the conventional roof airbag apparatus, when an impact is applied to the airbag that is in a deployed state, the airbag may be excessively deformed. In this case, the airbag cannot reliably support the occupant, and the occupant may be thrown out of the vehicle through the opening of the sunroof. Therefore, there is a need to improve this configuration.

SUMMARY OF THE INVENTION

Embodiments of the present invention are directed to a roof airbag apparatus capable of reducing the degree to which an airbag is deformed when an impact is applied to the airbag, thus making it possible to stably protect an occupant.

In one embodiment, a roof airbag apparatus may include: a gas injection unit configured to discharge gas; a tether guide extending in a longitudinal direction of a roof; and an airbag configured to be deployed by gas transferred from the gas injection unit. The airbag may include: a first chamber part coupled to the tether guide and configured to be deployed in a longitudinal direction of the tether guide by gas transferred from the gas injection unit; and a second chamber part coupled to the first chamber part, and configured to be deployed by gas transferred from the first chamber part and cover the first chamber part.

The tether guide may comprise a pair of tether guides disposed at a positions spaced apart from each other.

The tether guides may be disposed on respective opposite sides of the roof to support opposite sides of the airbag.

The first chamber part may include: a first leading deployment part including a pair of first leading chamber parts coupled to the tether guide and configured to be deployed by gas transferred from the gas injection unit, and a second leading chamber part disposed between the first leading chamber parts and configured to be deployed by gas transferred from the first leading chamber parts; and a first trailing deployment part configured to be deployed by gas transferred from the first leading chamber part and transfer the gas to the second chamber part.

The first trailing deployment part may include: a pair of first trailing chamber parts coupled to the tether guide and configured to be deployed by gas transferred from the first leading deployment part; and a second trailing chamber part disposed between the first trailing chamber parts, and configured to be deployed by gas transferred from the first trailing chamber parts and transfer the gas to the second chamber part.

The second chamber part may be disposed over or under the first trailing deployment part and covers the first trailing deployment part.

The second chamber part may include: a second chamber gas inflow part configured to receive gas from the first trailing deployment part; and a second chamber deployment part configured to receive gas from the second chamber gas inflow part, and extending in a direction intersecting a direction in which the first trailing chamber part or the second trailing chamber part is deployed.

The second chamber gas inflow part may extend in the longitudinal direction of the tether guide and guide gas transferred from the first chamber part toward the gas injection unit.

The second chamber gas inflow part and the second chamber deployment part may be partitioned by a second chamber inactive-part so that gas is transferred to the second chamber deployment part via the second chamber gas inflow part.

The first leading chamber part and the second leading chamber part may be partitioned by a leading inactive part, and the leading inactive part may be convex toward the gas injection unit.

The first trailing chamber part and the second trailing chamber part may be partitioned by a trailing inactive part, and the trailing inactive part may be convex toward the gas injection unit.

The second chamber inactive part may be formed in a direction intersecting the leading inactive part or the trailing inactive part.

The airbag may further include a chamber coupling part coupling an end of the second chamber part to the first chamber part while the first chamber part overlaps the second chamber part.

The chamber coupling part may couple the end of the second chamber part that is adjacent to the gas injection unit to an inactive part partitioning the first trailing chamber part from the second trailing chamber part.

The present invention may provide a roof airbag apparatus that employs a second chamber part covering a first chamber part so that the degree to which an airbag is deformed when an impact is applied thereto can be reduced, thereby reducing the degree of displacement or injury of an occupant.

DESCRIPTION OF SPECIFIC EMBODIMENTS

Hereinafter, an embodiment of a roof airbag apparatus in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
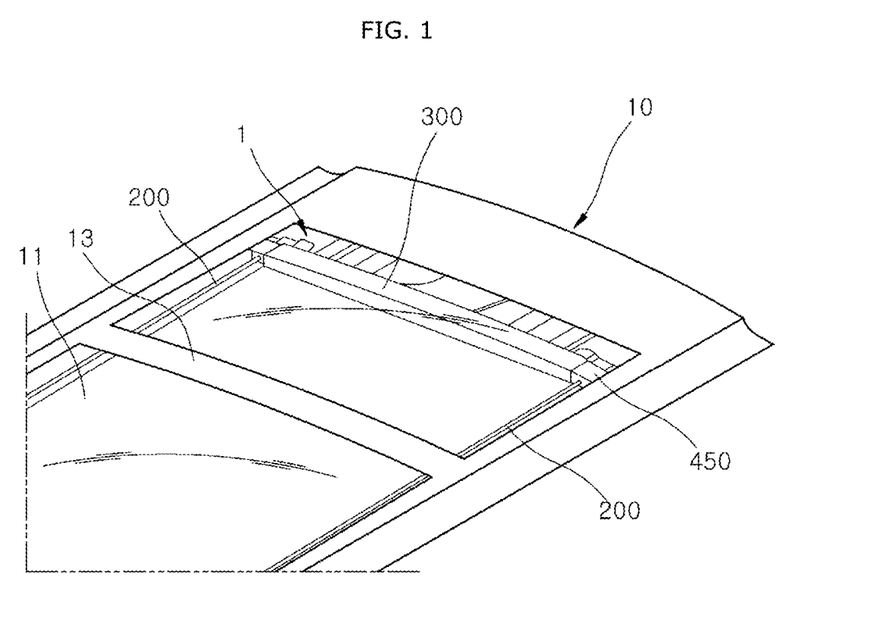
FIG. 1 is a schematic view illustrating a vehicle provided with a roof airbag apparatus in accordance with an embodiment of the present invention.
Figure 2:
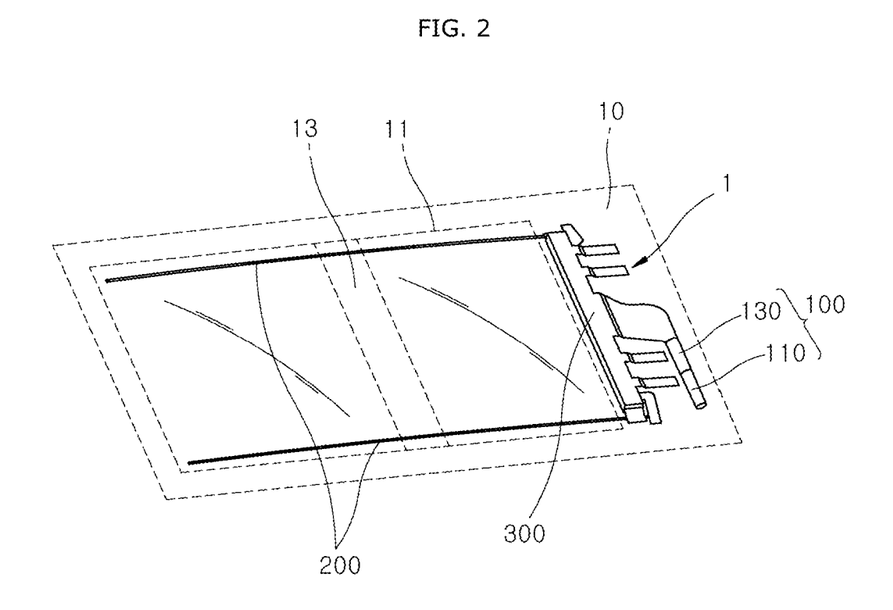
FIG. 2 is a schematic view illustrating the roof airbag apparatus in accordance with the embodiment of the present invention.
Figure 3:
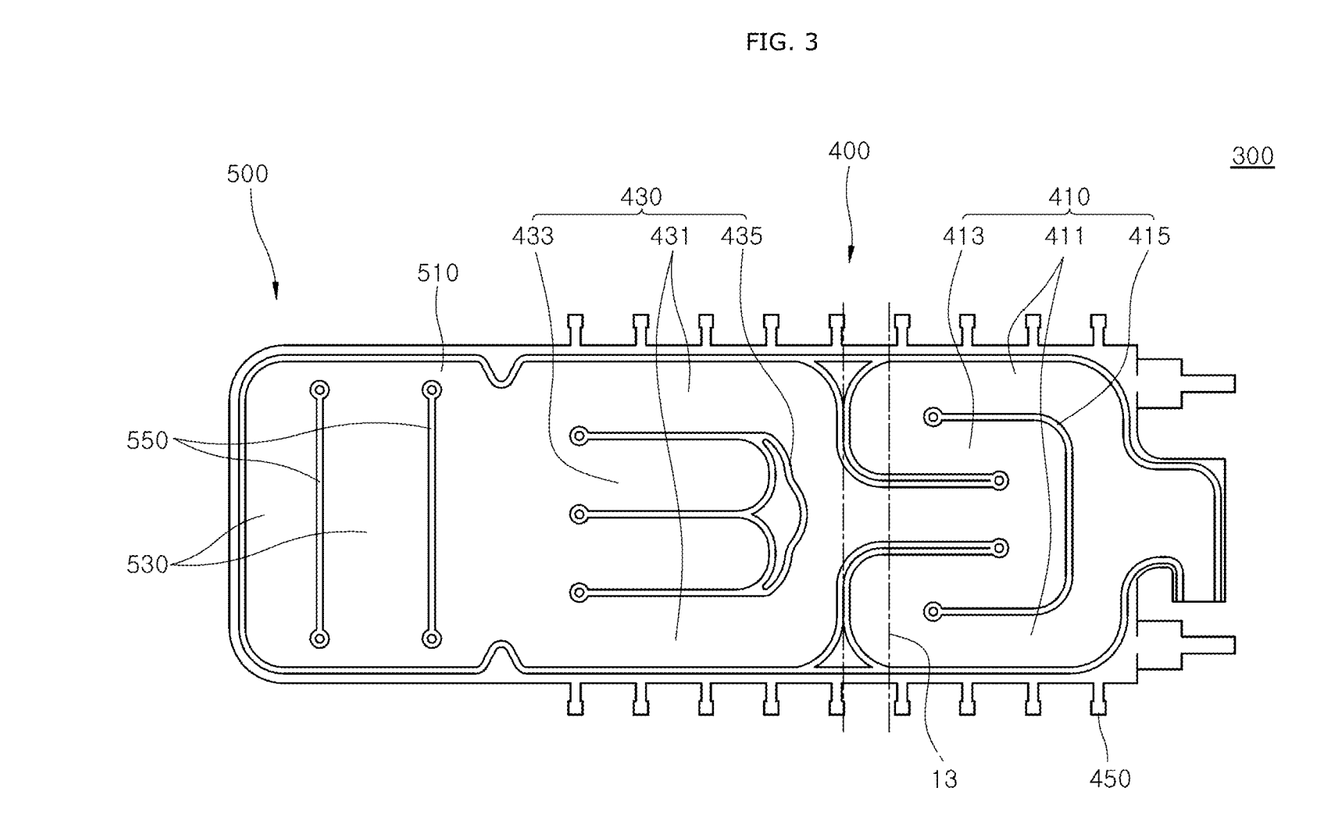
FIG. 3 is a view illustrating a deployed state of an airbag of the roof airbag apparatus in accordance with the embodiment of the present invention.

FIG. 1 is a schematic view illustrating a vehicle provided with a roof airbag apparatus in accordance with an embodiment of the present invention. FIG. 2 is a schematic view illustrating the roof airbag apparatus in accordance with the embodiment of the present invention. FIG. 3 is a view illustrating a deployed state of an airbag of the roof airbag apparatus in accordance with the embodiment of the present invention.

Referring to FIGS. 1 to 3, the roof airbag apparatus 1 in accordance with the embodiment of the present invention includes a gas injection unit 100, a tether guide 200, and an airbag 300.

The gas injection unit 100 is installed in an upper part of the vehicle, for example, on a side of a panorama type sunroof 11 mounted in a roof 10 of the vehicle. The gas injection unit 100 functions to inject gas into the airbag 300 to deploy the airbag 300 in an event of emergency, e.g., a collision or rollover of the vehicle. In the present embodiment, the gas injection unit 100 includes an inflator 110 and a gas guide 130.

In the present embodiment, so as to reinforce an opening of the roof 10 of the vehicle in which the sunroof 11 is mounted, the roof 10 may include a roof frame 13 which is provided in an approximately intermediate portion of the opening and transverses in a lateral direction of the vehicle.

The inflator 110 is configured to generate gas. In the present embodiment, the inflator 110 is installed in the upper part of the vehicle, for example, in the roof 10 of the vehicle, by a method such as bolting or welding.

In the present embodiment, the inflator 110 includes an ignition device (not shown), and generates gas, e.g., in such a way that the ignition device ignites gunpowder in response to a sensing signal of a collision sensor (not shown), and then injects the gas into the airbag 300.

The gas guide 130 guides gas transferred from the inflator 110 into the airbag 300. In the present embodiment, the gas guide 130 has the form of a pipe made of material including metal and couples the inflator 110 with the airbag 300.

The tether guide 200 is disposed in a longitudinal direction (a left-and-right direction based on FIG. 3) of the panorama sunroof 11. In the present embodiment, a pair of tether guides 200 are provided parallel to each other at positions spaced apart from each other with respect to a lateral direction (an up-and-down direction based on FIG. 3) of the roof 10. The tether guides 200 are disposed on opposite sides of the roof 10 to support respective opposite sides of the airbag 300.

In the present embodiment, as such, the tether guides 200 are disposed on the opposite sides of the panorama type sunroof 11 and support the respective opposite sides of the airbag 300. Hence, when the airbag 300 is deployed, the tether guides 200 can reliably support the opposite sides of the airbag 300 to prevent displacement or injury of an occupant.

In the present embodiment, each tether guide 200 is formed of a wire extending a predetermined length in a front-and-rear direction of the vehicle by way of example. Furthermore, various examples as well as the wire may be applied to the tether guide 200 within a technical spirit of the present invention so long as it can guide the deployment of the airbag 300 and support the airbag 300.

Figure 4:
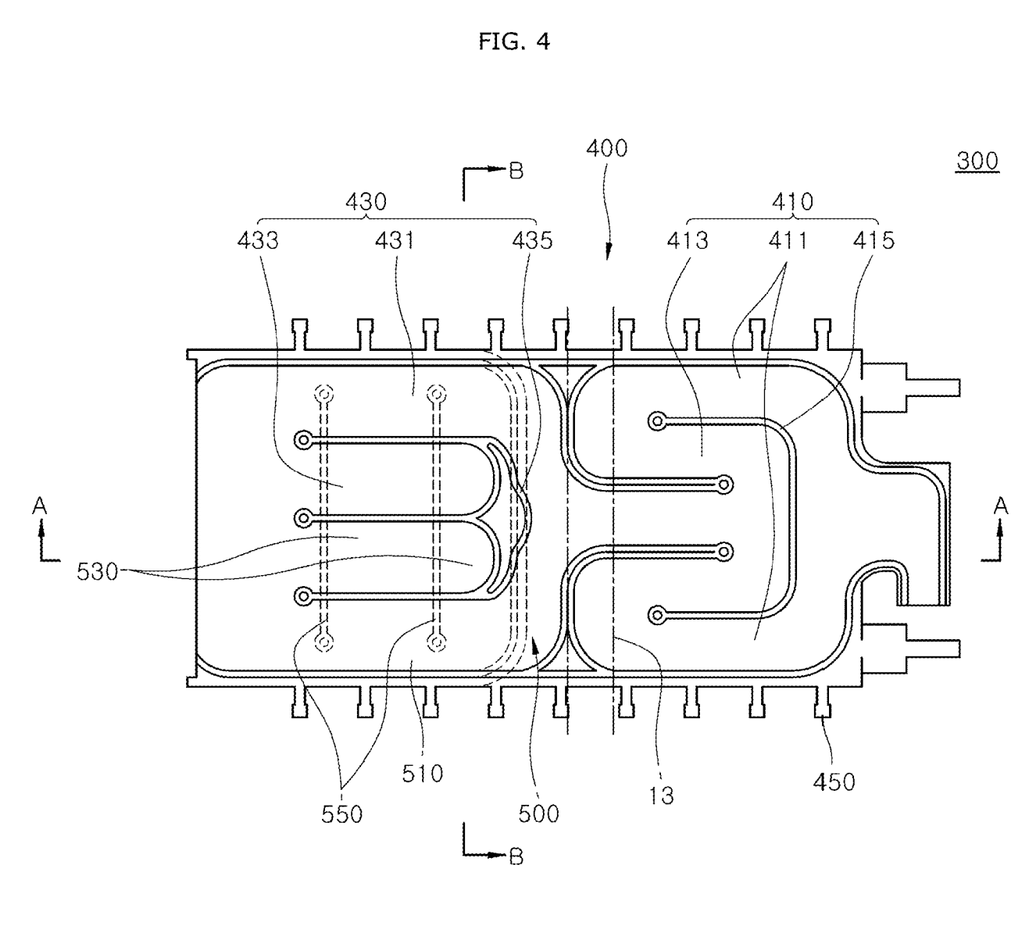
FIG. 4 is a view illustrating a folded state of the airbag of the roof airbag apparatus in accordance with the embodiment of the present invention.

FIG. 4 is a view illustrating a folded state of the airbag of the roof airbag apparatus in accordance with the embodiment of the present invention. Referring to FIGS. 1 to 4, the airbag 300 may be deployed by gas supplied from the gas injection unit 100. In the present embodiment, the airbag 300 includes a first chamber part 400 and a second chamber part 500.

The first chamber part 400 is coupled to the tether guides 200 and deployed in the longitudinal direction of the tether guides 200 by gas supplied from the gas injection unit 100. In the present embodiment, the first chamber part 400 includes a first leading deployment part 410, a first trailing deployment part 430, and a connection tab 450.

The first leading deployment part 410 may be supplied with gas from the gas injection unit 100 and deployed in the longitudinal direction of the tether guide 200, and transfer the gas to the first trailing deployment part 430.

In the present embodiment, the first leading deployment part 410 includes a first leading chamber part 411 and a second leading chamber part 413.

A pair of first leading chamber parts 411 are provided and respectively coupled to the tether guides 200. The first leading chamber parts 411 may be deployed in the longitudinal direction of the tether guides 200 by gas supplied from the gas injection unit 100.

The second leading chamber part 413 is disposed between the first leading chamber parts 411, and may be deployed by gas transferred from the first leading chamber parts 411.

The first leading chamber parts 411 and the second leading chamber part 413 are partitioned from each other by a leading inactive part 415 and configured such that gas that has passed through the first leading chamber parts 411 is transferred to the second leading chamber part 413. In the present embodiment, the leading inactive part 415 has an approximately 'U' shape which is convex toward the gas injection unit 100, and functions to control the direction of movement of gas drawn into the first leading deployment part 410.

The first trailing deployment part 430 is coupled to the first leading deployment part 410 and the tether guides 200, and may be deployed in the longitudinal direction of the tether guides 200 when gas is transferred from the first leading deployment part 410. In the present embodiment, the first trailing deployment part 430 includes a first trailing chamber part 431 and a second trailing chamber part 433.

The first trailing chamber part 431 is coupled to the tether guides 200, and may be deployed by gas transferred from the first leading deployment part 410, and transfer the gas to the second chamber part 500.

The second trailing chamber part 433 is disposed between opposite portions of the first trailing chamber part 431, and may be deployed by gas transferred from the first trailing chamber part 431, and transfer the gas to the second chamber part 500.

The first trailing chamber part 431 and the second trailing chamber part 433 are partitioned from each other by a trailing inactive part 435 and configured such that gas that has passed through the first trailing chamber part 431 is transferred to the second trailing chamber part 433. In the present embodiment, the trailing inactive part 435 has an approximately 'U' shape which is convex toward the gas injection unit 100, and functions to control the direction of movement of gas drawn into the first trailing deployment part 430.

The connection tab 450 couples the first chamber part 400 with the tether guides 200, and is provided so as to be movable in the longitudinal direction of the tether guides 200. In the present embodiment, a plurality of connection tabs 450 are provided and arranged in the longitudinal direction of the first chamber part 400. The connection tabs 450 are coupled to left and right ends of the first chamber part 400 and function to guide deployment of the first chamber part 400 and support the opposite ends of the first chamber part 400.

The second chamber part 500 is coupled to the first chamber part 400, and may be deployed by gas transferred from the first chamber part 400 to reinforce the first chamber part 400 in such a way that the second chamber part 500 covers a portion or the entirety of the first chamber part 400. Thus, when an impact is applied to the first chamber part 400, the second chamber part 500 can reduce the degree to which the first chamber part 400 is deformed by the impact. In the present embodiment, the second chamber part 500 includes a second chamber gas inflow part 510 and a second chamber deployment part 530.

The second chamber gas inflow part 510 receives gas from the first trailing deployment part 430 and transfers the gas to the second chamber deployment part 530. In the present disclosure, the second chamber gas inflow part 510 extends in the longitudinal direction of the tether guides 200 and functions to guide gas transferred from the first chamber part 400 toward the gas injection unit 100.

In other words, the second chamber gas inflow part 510 guides movement of gas in a direction opposite to the direction in which the first chamber part 400 is deployed.

The second chamber gas inflow part 510 and the second chamber deployment part 530 are partitioned from each other by a second chamber inactive-part 550 such that gas may be transferred to the second chamber deployment part 530 via the second chamber gas inflow part 510.

In the present embodiment, the second chamber inactive-part 550 extends a predetermined length in a direction intersecting the leading inactive part 415 or the trailing inactive part 435, for example, in the lateral direction of the vehicle, so as to guide movement of fluid. Therefore, the second chamber inactive-part 550 that overlaps the first chamber part 300 can reduce the degree to which the airbag is deformed by an impact.

Figure 5:
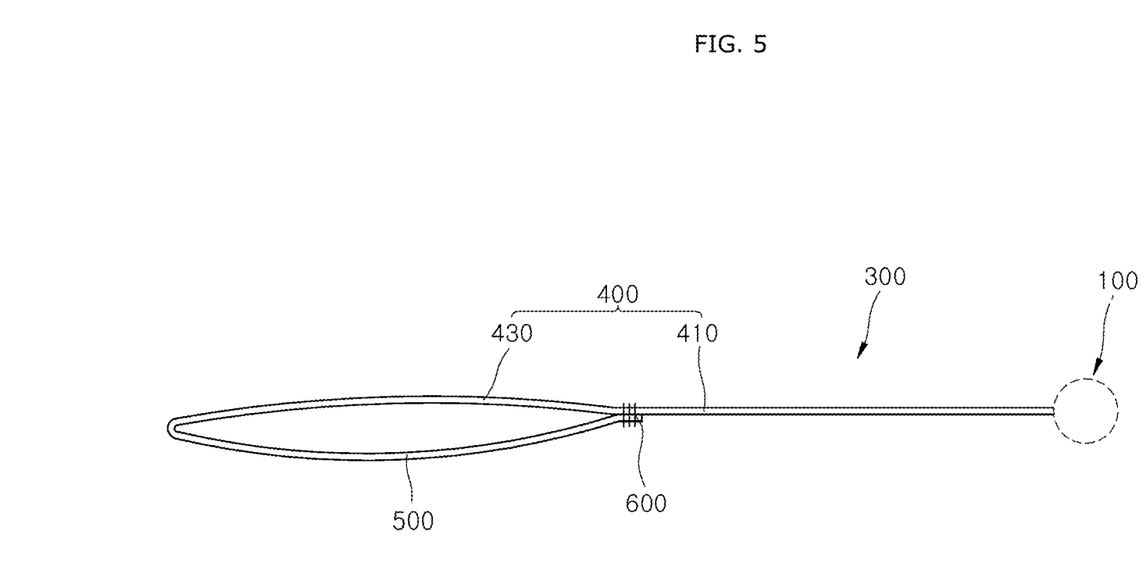
FIG. 5 is a sectional view taken along line 'A-A' of FIG. 4.
Figure 6:
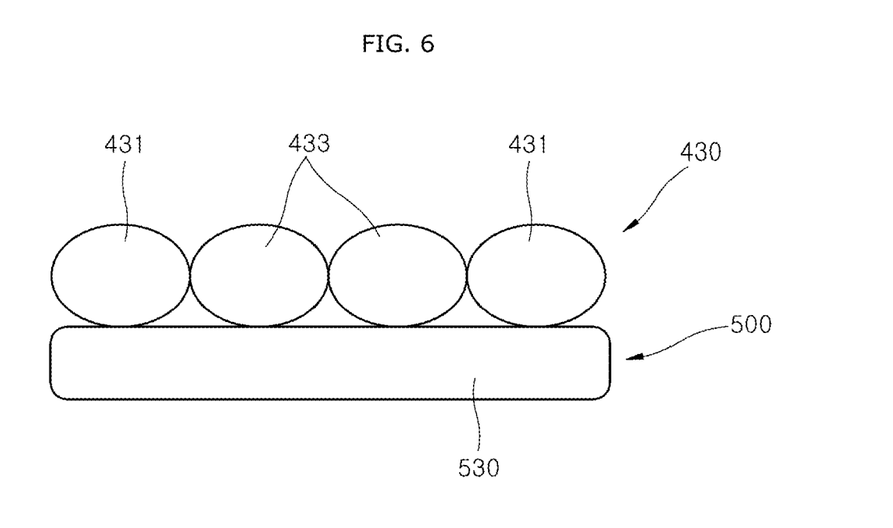
FIG. 6 is a sectional view taken along line 'B-B' of FIG. 4.
Figure 7:
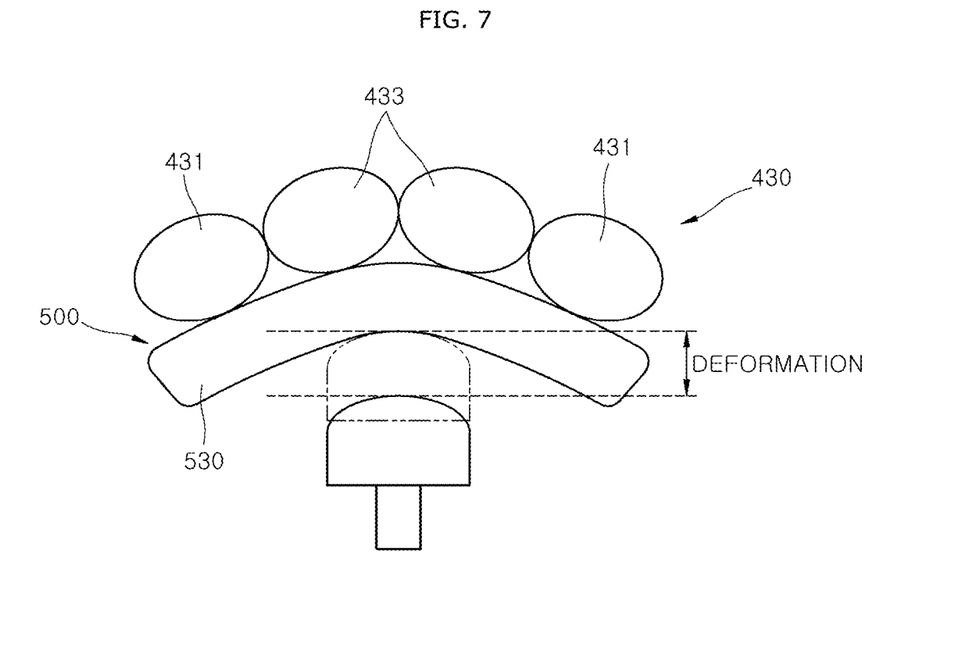
FIG. 7 is a view illustrating the state of the airbag of FIG. 6 when an impact is applied thereto.

FIG. 5 is a sectional view taken along line 'A-A' of FIG. 4. FIG. 6 is a sectional view taken along line 'B-B' of FIG. 4. FIG. 7 is a view illustrating the state of the airbag of FIG. 6 when an impact is applied thereto.

Referring to FIGS. 5 to 7, the second chamber deployment part 530 is configured to be deployed by gas transferred from the second chamber gas inflow part 510 and extends in a direction intersecting the direction in which the first trailing chamber part 431 or the second trailing chamber part 433 is deployed. Thus, when an impact is applied to a portion of the airbag that overlaps the first trailing chamber part 431 or the second trailing chamber part 433, the degree to which the portion of the airbag is deformed can be reduced by the second chamber deployment part 530.

In the present embodiment, the airbag 300 includes a chamber coupling part 600. The chamber coupling part 600 couples an end of the second chamber part 500 to the first chamber 400, e.g., in a stitching manner, while the first chamber 400 overlaps the second chamber part 500.

In the present embodiment, the chamber coupling part 600 couples the end of the second chamber part 500 that is adjacent to the gas injection unit 100 to the inactive part 415 or 435 of the first chamber part 400, e.g., in a stitching manner, so that the first chamber part 400 and the second chamber part 500 may be deployed in a state in which the second chamber part 500 overlaps the first chamber part 400.

Hereinafter, the operating principle and the effect of the roof airbag apparatus 1 in accordance with the embodiment of the present invention will be described.

In an event of emergency such as a collision or rollover of the vehicle, gas is generated and discharged from the gas injection unit 100 in response to a signal generated from the collision sensor. Gas generated from the gas injection unit 100 deploys the first chamber part 400 and is transferred to the second chamber part 500.

Gas transferred to the first chamber part 400 is transferred to the first trailing deployment part 430 via the first leading deployment part 410 disposed on a side of the roof frame 13.

Gas transferred to the first leading deployment part 410 passes through the first leading chamber parts 411 that are coupled to the tether guides 200 and disposed on the opposite sides, and then is transferred to the second leading chamber part 413. Hence, while the first leading chamber part 411 is deployed, a sufficient deployment speed with respect to the longitudinal direction of the tether guides 200 can be secured.

Gas transferred to the second leading chamber part 413 is transferred to the first trailing deployment part 430, thus deploying the first trailing deployment part 430 in a sequence from the first trailing chamber part 431 to the second trailing chamber part 433. Therefore, a sufficient deployment speed with respect to the longitudinal direction of the tether guides 200 can be secured, in the same manner as that of the first leading deployment part 410.

Gas that has passed through the first trailing deployment part 430 is transferred to the second chamber part 500, thus deploying the second chamber part 500. In the present embodiment, the second chamber part 500 is coupled at the end thereof to the trailing inactive part 435 of the first trailing deployment part 430 by the chamber coupling part 600 in a state in which the portion of the second chamber part 500 that is coupled with the first trailing deployment part 430 is folded and overlapped with the first trailing deployment part 430.

As such, the second chamber part 500 is deployed in a state in which it covers the first chamber part 400, particularly, an upper side or a lower side of the first trailing deployment part 430. Consequently, even when an impact is applied to the first trailing deployment part 430, the degree to which the first trailing deployment part 430 is bent can be reduced, whereby displacement, etc. of the occupant can be prevented.

As described above, the roof airbag apparatus 1 in accordance with the embodiment of the present invention employs the second chamber part 500 that covers a portion or the entirety of one surface of the first chamber part 400, so that the degree to which the airbag 300 is deformed when an impact is applied thereto can be reduced, whereby the degree of displacement or injury of the occupant can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A roof airbag apparatus comprising:
   a gas injection unit configured to discharge gas;
   a tether guide extending in a longitudinal direction of a roof; and
   an airbag configured to be deployed by the gas transferred from the gas injection unit,
   wherein the airbag comprises:
   a first chamber part coupled to the tether guide and configured to be deployed in a longitudinal direction of the tether guide by the gas transferred from the gas injection unit; and
   a second chamber part coupled to the first chamber part, and configured to be deployed by the gas transferred from the first chamber part and cover the first chamber part,
   wherein the first chamber part comprises:
      a first leading deployment part including a pair of first leading chamber parts coupled to the tether guide and configured to be deployed by the gas transferred from the gas injection unit, and a second leading chamber part disposed between the first leading chamber parts and configured to be deployed by the gas transferred from the first leading chamber parts, and
      a first trailing deployment part configured to be deployed by the gas transferred from the first leading chamber part and transfer the gas to the second chamber part,
   wherein the first trailing deployment part comprises:
      a pair of first trailing chamber parts coupled to the tether guide and configured to be deployed by the gas transferred from the first leading deployment part, and
      a second trailing chamber part disposed between the first trailing chamber parts, and configured to be deployed by the gas transferred from the first trailing chamber parts and transfer the gas to the second chamber part.

2. The roof airbag apparatus according to claim 1, wherein the tether guide comprises a pair of tether guides disposed at positions spaced apart from each other.

3. The roof airbag apparatus according to claim 2, wherein the tether guides are disposed on respective opposite sides of the roof to support opposite sides of the airbag.

4. The roof airbag apparatus according to claim 1, wherein the second chamber part is disposed over or under the first trailing deployment part and covers the first trailing deployment part.

5. The roof airbag apparatus according to claim 4, wherein the airbag further comprises a chamber coupling part coupling an end of the second chamber part to the first chamber part while the first chamber part overlaps the second chamber part.

6. The roof airbag apparatus according to claim 5, wherein the chamber coupling part couples the end of the second chamber part that is adjacent to the gas injection unit to an inactive part partitioning the first trailing chamber part from the second trailing chamber part.

7. The roof airbag apparatus according to claim 1, wherein the second chamber part comprises:
   a second chamber gas inflow part configured to receive the gas from the first trailing deployment part; and
   a second chamber deployment part configured to receive the gas from the second chamber gas inflow part, and extending in a direction intersecting a direction in which the first trailing chamber part or the second trailing chamber part is deployed.

8. The roof airbag apparatus according to claim 7, wherein the second chamber gas inflow part extends in the longitudinal direction of the tether guide and guides the gas transferred from the first chamber part to the second chamber deployment part in a direction toward the gas injection unit.

9. The roof airbag apparatus according to claim 7, wherein the second chamber gas inflow part and the second chamber deployment part are partitioned by a second chamber inactive-part so that the gas is transferred to the second chamber deployment part via the second chamber gas inflow part.

10. The roof airbag apparatus according to claim 9, wherein the first leading chamber part and the second leading chamber part are partitioned by a leading inactive part, and the leading inactive part is convex toward the gas injection unit.

11. The roof airbag apparatus according to claim 10, wherein the first trailing chamber part and the second trailing chamber part are partitioned by a trailing inactive part, and the trailing inactive part is convex toward the gas injection unit.

12. The roof airbag apparatus according to claim 11, wherein the second chamber inactive part is formed in a direction intersecting a direction in which the leading inactive part or the trailing inactive part extends.

* * * * *